(12) United States Patent
Itaya et al.

(10) Patent No.: US 6,958,193 B2
(45) Date of Patent: Oct. 25, 2005

(54) LAMINATED POLYOLEFIN FILMS AND METHODS OF PRODUCTION THEREOF BY COEXTRUSION

(75) Inventors: Yukiyasu Itaya, Gamagori (JP); Michiya Hiei, Gamagori (JP); Toshiya Kamei, Gamagori (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 10/452,808

(22) Filed: May 30, 2003

(65) Prior Publication Data

US 2004/0241452 A1 Dec. 2, 2004

(51) Int. Cl.$^7$ .......................... B32B 27/32; B32B 31/30
(52) U.S. Cl. .................. 428/516; 264/173.14; 264/211; 428/515; 428/922
(58) Field of Search ............................ 264/173.14, 211; 428/515, 516, 922

(56) References Cited

U.S. PATENT DOCUMENTS 5,110,639 A  *  5/1992  Akao ........................ 428/35.2

* cited by examiner

Primary Examiner—D. S. Nakarani
(74) Attorney, Agent, or Firm—Beyer Weaver & Thomas LLP

(57) ABSTRACT

A laminated polyolefin film with two or more layers is produced by coextrusion. An outer-layer forming material is prepared by with olefin resin containing specified kinds of non-ionic surfactant and salt of organic sulfonic acid in a specified amount and at a specified ratio. In the production of the laminated polyolefin film by coextrusion, this outer-layer forming material is used to form either one or both of the outer layers if the laminated film is to have three or more layers and to form only one of the outer layers if the laminated film is to have only two layers.

16 Claims, 1 Drawing Sheet

LAMINATED POLYOLEFIN FILMS AND METHODS OF PRODUCTION THEREOF BY COEXTRUSION

BACKGROUND OF THE INVENTION

This invention relates to methods of producing laminated polyolefin films by coextrusion and laminated polyolefin films produced by coextrusion.

Laminated polyolefin films produced by coextrusion are coming to be used widely as food packaging and agricultural materials. Depending upon their intended use, such laminated polyolefin films are required not only to be transparent but also to have both antistatic and antifogging properties at the same time, and demands for improving these properties are becoming severe in recent years. The present invention relates to methods of producing laminated polyolefin films by coextrusion and laminated polyolefin films produced by coextrusion with which such demands can be met.

Prior art examples of compounds and compositions for providing antistatic and antifogging properties to laminated polyolefin films as they are being produced by coextrusion include (1) glyceride (Japanese Patent Publication Tokkai 63-173640), (2) betaines, polyoxyethylene alkylamines and polyoxyethylene alkylamine fatty acid esters (Japanese Patent Publication Tokkai 7-251445), (3) esters of polyhydric alcohol and fatty acid and hydroxyalkyl substituted aliphatic amines (Japanese Patent Publication Tokkai 10-80985), (4) ethylene oxide adduct of betaines, quaternary ammonium salts and glycerol aliphatic acid esters (Japanese Patent Publication Tokkai 11-115124), and (5) hydroxyalkyl substituted fatty acid amides, polyoxyethylene alkylamines and polyoxyethylene alkylamides (Japanese Patent Publication Tokkai 11-240115). These prior art compounds and compositions have the problem that they cannot provide superior and durable antistatic and antifogging properties to a laminated polyolefin film without adversely affecting its natural transparency.

SUMMARY OF THE INVENTION

It is therefore an object of the present invention to provide a method of not only producing a laminated polyolefin film by coextrusion but also providing it with superior and durable antistatic and antifogging properties without adversely affecting its natural transparency.

The invention is based on the discovery by the present inventors as a result of their diligent research in view of the above object that a proper method is to add, when a laminated polyolefin film is being produced by coextrusion, a non-ionic surfactant and a salt of organic sulfonic acid of specified kinds at a specified ratio to an olefin resin which will form the outer layer of this laminated polyolefin film such that they together will have a specified concentration.

DETAILED DESCRIPTION OF THE INVENTION

Figure 1:
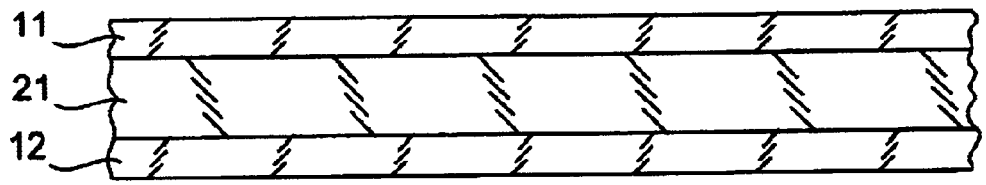
FIG. 1 is a sectional view of a portion of a laminated polyolefin film embodying this invention.

The present invention relates to a method of producing a laminated polyolefin film by coextrusion characterized wherein a non-ionic surfactant and salt of organic sulfonic acid of specified kinds described below are mixed to the olefin resin which (also referred to as "outer-layer forming material") will be forming one or both outer surfaces of the laminated polyolefin film being produced by coextrusion if the laminated polyolefin film to be produced is to have three or more layers and one of the outer surfaces of the laminated polyolefin film being produced by coextrusion if the laminated polyolefin film to be produced is to have two layers such that the total of the added non-ionic surfactant and salt of organic sulfonic acid will be 0.05–3 weight % and the weight ratio of their concentrations will be 20/80–99/1, as well as a laminated polyolefin film produced by such a method where the non-ionic surfactant is one or more selected from the group consisting of partial esters of polyoles of valence 3–6 and aliphatic monocarboxylic acid with 6–22 carbon atoms, alkyl diethanol amines with alkyl group with 6–22 carbon atoms and alkyl diethanol amides with acyl group with 6–22 carbon atoms, and the salt of organic sulfonic acid is one or more selected from the group consisting of alkali salts of alkyl sulfonic acid with alkyl group with 6–22 carbon atoms, alkali salts of alkyl aryl sulfonic acid with alkyl group with 6–22 carbon atoms and alkali salts of sulfo fatty acid esters with alkyl group with 6–22 carbon atoms.

Examples of olefin resin to be used in the method of producing laminated polyolefin films by coextrusion according to this invention (hereinafter referred to simply as the method of this invention) include (1) α-olefin single polymers such as polyethylene and polypropylene that may be obtained from one selected from α-olefin with 2–8 carbon atoms such as ethylene, propylene, 1-butene, 1-hexene, 4-methylpentene-1 and 1-octene; (2) α-olefin copolymers such as ethylene-propylene copolymers, ethylene•1-butene copolymers and ethylene•1-hexene copolymers obtained from two or more selected from aforementioned α-olefin with 2–8 carbon atoms; (3) copolymers obtained from ethylene and vinyl acetate; and (4) copolymers obtained from ethylene and vinyl alcohol. Among these, however, α-olefin single polymers of (1) and those α-olefin copolymers of (2) are preferable. Among α-olefin copolymers of (2), in particular, those being copolymers of ethylene and α-olefin with 4–8 carbon atoms and containing units formed by α-olefin with 4–8 carbon atoms in an amount of 3.5–50 weight % are preferred. Among such α-olefin copolymers, those obtained by any of the conventionally known methods such as the gas phase polymerization method and the solution polymerization using a Ziegler-Natta catalyst, a metallocene catalyst or a homogeneous catalyst are more preferred. Those with density of 0.86–0.94 g/cm$^3$ and MFR (melt flow rate) within the range of 0.01–20 g/10 minutes are particularly preferred. Two or more such olefin resins may be mixed to be used.

When a laminated polyolefin film is produced from such an olefin resin by coextrusion by a method of this invention, a non-ionic surfactant and a salt of organic sulfonic acid of specified kinds as explained above are mixed with the olefin resin which eventually forms an outer layer either on one side or on both sides of the produced laminated polyolefin film if the latter is a film with three or more layers and only one layer on one of the outer surfaces of the produced laminated polyolefin film if it is a film with only two layers.

Examples of the polyoles with valence 3–6, which may serve as a material for the partial ester for the aforementioned non-ionic surfactant for the method of production according to this invention, include (1) polyhydric alcohols such as glycerol, pentaerythritol, sorbitol and glucose; (2) cyclic ethers of polyhydric alcohol obtained by dehydration of sorbitol such as sorbitan and sorbide; (3) (poly)ether tetraoles such as diglycerol and ethylene glycol diglyceryl ether; (4) (poly)ether pentaoles such as triglycerol and trimethylol propane diglyceryl ether; and (5) (poly)ether hexaoles such as tetraglycerol and dipentaerythritol, but polyoles of valence 4 and 5 are preferred.

Examples of aliphatic monocarboxylic acid with 6–22 carbon atoms, which is another material for the partial ester, include hexanoic acid, octanoic acid, lauric acid, myristic acid, stearic acid, behenic acid, myristoleic acid, oleic acid, erucic acid, isostearic acid and 12-hydroxy stearic acid. Among these, aliphatic monocarboxylic acids with 12–18 carbon atoms are preferred. These partial esters are obtained from an appropriate combination of polyole of valence 3–6 and aliphatic monocarboxylic acid with 6–22 carbon atoms. In all cases, the partial ester that is obtained contains at least one free hydroxyl group per molecule.

Examples of alkyl diethanol amine with alkyl group with 6–22 carbon atoms to be used as a non-ionic surfactant in the production method according to this invention include hexyl diethanol amine, octyl diethanol amine, lauryl diethanol amine, myristyl diethanol amine, palmityl diethanol amine, stearyl diethanol amine and behenyl diethanol amine. Among these, alkyl diethanol amines with alkyl group with 12–18 carbon atoms are preferred.

Examples of alkyl diethanol amide with acyl group with 6–22 carbon atoms to be used as a non-ionic surfactant in the production method according to this invention include hexyl diethanol amide, octyl diethanol amide, lauryl diethanol amide, myristyl diethanol amide, palmityl diethanol amide, stearyl diethanol amide and behenyl diethanol amide. Among these, alkyl diethanol amides with acyl group with 12–18 carbon atoms are preferred.

Among the non-ionic surfactants mentioned above for the method of production according to this invention, those partial esters having 3 or 4 free hydroxyl groups and one or two ester bonds per molecule such as diglycerol monostearate, triglycerol monolaurate, sorbitan monostearate and triglycerol dilaurate obtained from polyole with valence 4 or 5 and aliphatic monocarboxylic acid with 12–18 carbon atoms are preferred.

Examples of salt of organic sulfonic acid used in a method of production according to this invention include (1) alkali salts of alkyl sulfonic acid with alkyl group with 6–22 carbon atoms such as sodium hexyl sulfonate, sodium octyl sulfonate, sodium decyl sulfonate, sodium dodecyl sulfonate, lithium tetradecyl sulfonate, lithium hexadecyl sulfonate, lithium octadecyl sulfonate, potassium eicocyl sulfonate and potassium dococyl sulfonate; (2) alkali salts of alkyl aryl sulfonic acid with alkyl group with 2–22 carbon atoms such as sodium ethylbenzene sulfonate, sodium propylbenzene sulfonate, sodium butylbenzene sulfonate, sodium dodecylbenzene sulfonate, potassium octadecylbenzene sulfonate, potassium eicosylbenzene sulfonate and sodium dibutylnaphthalene sulfonate; and (3) alkali salts of sulfo fatty acid ester with alkyl group with 2–22 carbon atoms such as sodium diethyl sulfo succinate, sodium dipropyl sulfo succinate, sodium dioctyl sulfo succinate, lithium didodecyl sulfo succinate, lithium dieicosyl sulfo succinate, sodium dodecyl sulfo acetate and potassium α-(p-nonylphenyl)-ω-hydroxypoly(oxyethylene) sulfoacetate (oxyethylene repetition number=1–10). Among these, alkali salts of alkyl sulfonic acid with alkyl group with 6–22 carbon atoms are preferred, and alkali salts of alkyl sulfonic acid with alkyl group with 12–18 carbon atoms are particularly preferred.

When a laminated polyolefin film is produced from olefin resin by coextrusion by a method of this invention, a non-ionic surfactant and a salt of organic sulfonic acid of specified kinds as explained above are caused to be contained in the olefin resin, which forms an outer layer on one side or on both sides if the laminated polyolefin film to be produced has three or more layers and only on one side if the laminated polyolefin film to be produced has only two layers, in a total amount of 0.05–3 weight %, preferably in an amount of 0.1–2 weight % and more preferably in an amount of 0.2–0.9 weight % and at a weight ratio of 20/80–99/1, preferably of 50/50–90/10 and more preferably of 60/40–80/20.

The method of production by coextrusion according to this invention may be carried out by leading two or more kinds of olefin resin, plasticized by means of two or more extruders, into a common die and causing them to come into contact inside or at the opening of the die to thereby form in the first step a film with two or more layers. Known examples of such coextrusion method include the so-called T-die method and the tubular process.

The invention does not limit the number of layers in the laminated polyolefin film to be produced by a method described herein, although laminated polyolefin films with 2–5 layers are preferred for reasons of workability and economy. Neither does the invention limit the thickness of these layers but the thickness is usually 10–250 $\mu$m and preferably 15–150 $\mu$m. It is preferable that the thickness of the outer layer or layers of olefin resin containing aforementioned non-ionic surfactant and salt of organic sulfonic acid be less than the average of the thickness of each layer.

Laminated polyolefin films of this invention can be used as food packaging bags, agricultural materials such as multifilms and agricultural houses, heavy duty bags such as sugar bags and rice bags, reinforcing bags such as shopping bags and original laminate films with films of other kinds.

Any of the layers of a laminated polyolefin film of this invention may be caused to contain a different kind of agent, depending on the purpose of use. Examples of such agent, which may be thus caused to be contained, include thermal stabilizers, antioxidants, neutralizers, lubricants, weatherproof agents, ultraviolet radiation absorbers and antiblocking agents. It is preferable, however, to minimize the content of such additives.

Twelve examples of actually practicing this invention are described below:

EXAMPLE 1

A T-die method of producing a laminated polyolefin film having three layers by causing non-ionic surfactant (A-1) and salt of organic sulfonic acid (B-1) to be contained in polyethylene in an amount of 0.4 weight % at a weight ratio of 70/30 for forming outer layers on both sides and using an ethylene-1-butene copolymer for forming the inner layer, as well as a laminated polyolefin film having three layers thus produced, where non-ionic surfactant (A-1) indicates diglycerol monostearate and salt of organic sulfonic acid (B-1) indicates sodium myristyl sulfonate.

EXAMPLE 2

A T-die method of producing a laminated polyolefin film having three layers by causing non-ionic surfactant (A-2) and aforementioned salt of organic sulfonic acid (B-1) to be contained in an ethylene•1-butene copolymer in an amount of 0.5 weight % at a weight ratio of 80/20 for forming outer layers on both sides and using an ethylene•1-hexene copolymer for forming the inner layer, as well as a laminated polyolefin film having three layers thus produced, where non-ionic surfactant (A-2) indicates triglycerol monolaurate.

EXAMPLE 3

A T-die method of producing a laminated polyolefin film having three layers by causing non-ionic surfactant (A-3) and salt of organic sulfonic acid (B-2) to be contained in an ethylene vinyl acetate copolymer in an amount of 0.9 weight % at a weight ratio of 60/40 for forming outer layers on both sides and using polyethylene for forming the inner layer, as well as a laminated polyolefin film having three layers thus produced, where non-ionic surfactant (A-3) indicates sorbitan monostearate and salt of organic sulfonic acid (B-2) indicates sodium dioctyl sulfosuccinate.

EXAMPLE 4

A T-die method of producing a laminated polyolefin film having three layers by causing aforementioned non-ionic surfactant (A-2) and salt of organic sulfonic acid (B-1) to be contained in polyethylene in an amount of 0.4 weight % at a weight ratio of 70/30 for forming an outer layer on one side, using polyethylene as the other outer layer on the other side and using an ethylene•1-hexene copolymer for forming the inner layer, as well as a laminated polyolefin film having three layers thus produced.

EXAMPLE 5

A T-die method of producing a laminated polyolefin film having three layers by causing aforementioned non-ionic surfactant (A-3) and salt of organic sulfonic acid (B-1) to be contained in an ethylene•propylene copolymer in an amount of 0.5 weight % at a weight ratio of 80/20 for forming an outer layer on one side, using an ethylene•propylene copolymer as the other outer layer on the other side and using an ethylene•1-butene copolymer for forming the inner layer, as well as a laminated polyolefin film having three layers thus produced.

EXAMPLE 6

A T-die method of producing a laminated polyolefin film having three layers by causing aforementioned non-ionic surfactant (A-1) and salt of organic sulfonic acid (B-2) to be contained in an ethylene•1-hexene copolymer in an amount of 0.8 weight % at a weight ratio of 60/40 for forming an outer layer on one side, using an ethylene•1-hexene copolymer as the other outer layer on the other side and using an ethylene•propylene copolymer for forming the inner layer, as well as a laminated polyolefin film having three layers thus produced.

EXAMPLE 7

A tubular process method of producing a laminated polyolefin film having three layers by causing aforementioned non-ionic surfactant (A-1) and salt of organic sulfonic acid (B-1) to be contained in polyethylene in an amount of 0.4 weight % at a weight ratio of 70/30 for forming outer layers on both sides and using an ethylene •1-butene copolymer for forming the inner layer, as well as a laminated polyolefin film having three layers thus produced.

EXAMPLE 8

A tubular process method of producing a laminated polyolefin film having three layers by causing aforementioned non-ionic surfactant (A-3) and salt of organic sulfonic acid (B-2) to be contained in an ethylene•1-butene copolymer in an amount of 0.2 weight % at a weight ratio of 80/20 for forming outer layers on both sides and using an ethylene•1-hexene copolymer for forming the inner layer, as well as a laminated polyolefin film having three layers thus produced.

EXAMPLE 9

A tubular process method of producing a laminated polyolefin film having three layers by causing aforementioned non-ionic surfactant (A-2) and salt of organic sulfonic acid (B-1) to be contained in an ethylene•1-hexene copolymer in an amount of 0.8 weight % at a weight ratio of 60/40 for forming outer layers on both sides and using an ethylene•vinyl acetate copolymer for forming the inner layer, as well as a laminated polyolefin film having three layers thus produced.

EXAMPLE 10

A T-die method of producing a laminated polyolefin film having two layers by causing aforementioned non-ionic surfactant (A-1) and salt of organic sulfonic acid (B-1) to be contained in polyethylene in an amount of 0.4 weight % at a weight ratio of 70/30 for forming an outer layer on one side and using an ethylene•1-butene copolymer for forming the other outer layer on the other side, as well as a laminated polyolefin film having two layers thus produced.

EXAMPLE 11

A T-die method of producing a laminated polyolefin film having two layers by causing aforementioned non-ionic surfactant (A-3) and salt of organic sulfonic acid (B-2) to be contained in an ethylene•1-butene copolymer in an amount of 0.2 weight % at a weight ratio of 80/20 for forming an outer layer on one side and using polyethylene for forming the other outer layer on the other side, as well as a laminated polyolefin film having two layers thus produced.

EXAMPLE 12

A T-die method of producing a laminated polyolefin film having two layers by causing aforementioned non-ionic surfactant (A-2) and salt of organic sulfonic acid (B-1) to be contained in an ethylene•1-hexene copolymer in an amount of 0.9 weight % at a weight ratio of 60/40 for forming an outer layer on one side and using an ethylene•propylene copolymer for forming the other outer layer on the other side, as well as a laminated polyolefin film having two layers thus produced.

FIG. 1 shows a laminated polyolefin film embodying this invention with three layers such as Examples 1–3 and 7–9 described above, characterized as having outer layers 11 and 12 on both sides comprising olefin resin containing non-ionic surfactant and salt of organic sulfonic acid as described above in a specified amount and at a specified ratio and an inner layer 21 laminated therebetween comprising olefin resin not containing such non-ionic surfactant or salt of organic sulfonic acid.

Figure 2:
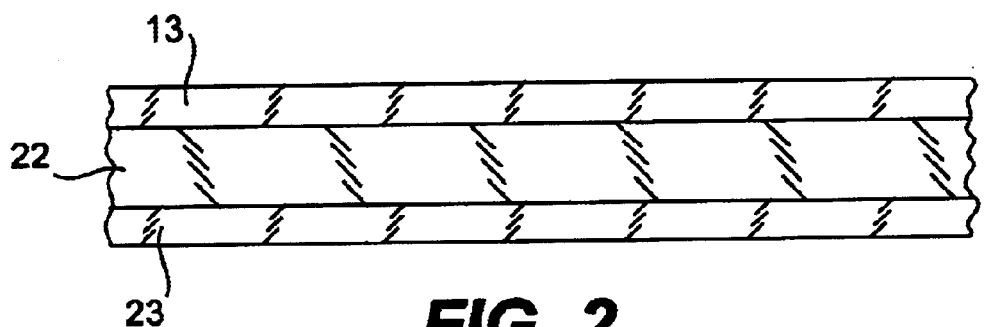
FIG. 2 is a sectional view of a portion of another laminated polyolefin film embodying this invention.

FIG. 2 shows another laminated polyolefin film embodying this invention with three layers such as Examples 4–6 described above, characterized as having an outer layer 13 on one side comprising olefin resin containing non-ionic surfactant and salt of organic sulfonic acid as described above in a specified amount and at a specified ratio, another outer layer 23 on the other side comprising olefin resin not containing such non-ionic surfactant or salt of organic sulfonic acid, and an inner layer 22 laminated therebetween comprising olefin resin not containing such non-ionic surfactant or salt of organic sulfonic acid.

Figure 3:
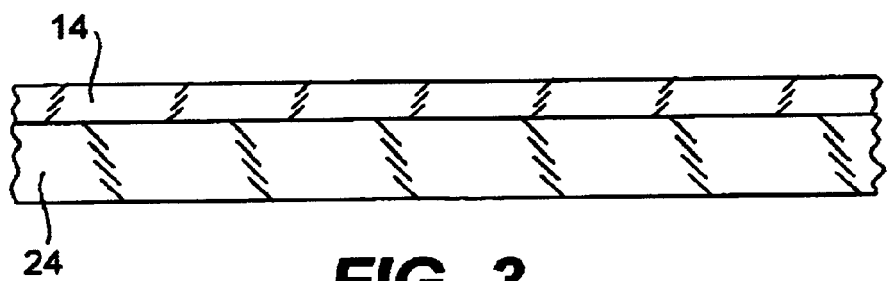
FIG. 3 is a sectional view of a portion of still another laminated polyolefin film embodying this invention.

FIG. 3 shows still another laminated polyolefin film embodying this invention with two layers such as Examples 10–12 described above, characterized as having an outer layer 14 on one side comprising olefin resin containing non-ionic surfactant and salt of organic sulfonic acid as described above in a specified amount and at a specified ratio and another outer layer 24 laminated thereon on the other side comprising olefin resin not containing such non-ionic surfactant or salt of organic sulfonic acid.

The invention is described next by way of examples for explaining its structure and effects more in detail but these examples are not intended to limit the scope of the invention. In what follows regarding test and comparison examples, "part" will mean "weight %" and "%" will mean "weight %" unless specifically explained to be otherwise.

Part 1 (Production of Laminated Polyolefin Films)

TEST EXAMPLE 1

Polyethylene (density 0.927 g/cm$^3$ and MFR 4.0 g/10 minutes) as olefin resin 90 parts, diglycerol monostearate as non-ionic surfactant 7 parts and sodium myristyl sulfonate as salt of organic sulfonic acid 3 parts were placed inside a tumbler, mixed together and thereafter melted and kneaded together by means of a twin extruder to obtain master pellets. These master pellets 4 parts and aforementioned polyethylene 96 parts were mixed together inside the tumbler. The mixture thus obtained was used for forming outer layers and ethylene•1-butene copolymer (ethylene unit ratio of copolymer=95%, density=0.92 g/cm$^3$ and, MFR=2.1 g/10 minutes) was used for inner layer in a T-die method of coextrusion while the mixture was cooled to 30° C. and to produce a laminated polyolefin film with three layers as shown in FIG. 1 with thickness 60 μm (ratio of thickness among the layers 11, 21, 12=1/4/1).

TEST EXAMPLES 2–9 AND COMPARISON EXAMPLES 1–4

As in Test Example 1, laminated polyolefin films of Test Examples 2–9 and Comparison Examples 1–4 were produced. Their details are shown together in Table 1.

TABLE 1

| | Additions | | | Olefin Resin for Each Layer | | |
|---|---|---|---|---|---|---|
| (A) | (B) | (A)/(B) | Concentration (%) | Outer Layer (11) | Inner Layer (21) | Outer Layer (12) |
| Test Examples: | | | | | | |
| 1 | A-1 | B-1 | 70/30 | 0.4 | E-1 | E-2 | E-1 |
| 2 | A-2 | B-1 | 80/20 | 0.5 | E-2 | E-3 | E-2 |
| 3 | A-3 | B-2 | 60/40 | 0.9 | E-4 | E-5 | E-4 |
| 4 | A-4 | B-3 | 50/50 | 1.0 | E-3 | E-2 | E-3 |
| 5 | A-5 | B-3 | 60/40 | 0.8 | E-7 | E-7 | E-7 |
| 6 | A-6 | B-4 | 30/70 | 2.0 | E-2 | E-3 | E-2 |
| 7 | A-7 | B-5 | 90/10 | 0.1 | E-2 | E-4 | E-2 |
| 8 | A-8 | B-5 | 20/80 | 3.0 | E-3 | E-7 | E-3 |
| 9 | A-9 | B-6 | 95/5 | 0.08 | E-3 | E-6 | E-3 |
| Comparison Examples: | | | | | | |
| 1 | A-5 | — | 100/0 | 0.5 | E-1 | E-2 | E-1 |
| 2 | A-7 | B-3 | 10/90 | 1.0 | E-1 | E-2 | E-1 |
| 3 | — | B-5 | 0/100 | 1.8 | E-2 | E-3 | E-2 |
| 4 | A-9 | B-6 | 50/50 | 5.0 | E-1 | E-2 | E-1 |

In Table 1 (and in subsequent Tables):
(A): Type of non-ionic surfactant;
(B): Type of salt of organic sulfonic acid;
(A)/(B): Weight ratio between (A) and (B);
E-1: Polyethylene (density 0.927 g/cm$^3$ and MFR 4.0 g/10 minutes);
E-2: Ethylene.1-butene copolymer (ethylene unit ratio of copolymer = 95%, density = 0.920 g/cm$^3$ and MFR = 2.1 g/10 minutes);
E-3: Ethylene.1-hexene copolymer (ethylene unit ratio of copolymer = 96%, density = 0.930 g/cm$^3$ and MFR = 1.0 g/10 minutes);
E-4: Ethylene.vinyl acetate1 copolymer (ethylene unit ratio of copolymer = 93%, density = 0.920 g/cm$^3$ and MFR = 1.5 g/10 minutes);
E-5: Ethylene.vinyl alcohol copolymer (ethylene unit ratio of copolymer = 30%, density = 1.19 g/cm$^3$ and MFR = 1.3 g/10 minutes);
E-6: Polyethylene (density = 0.953 g/cm$^3$ and MFR = 0.35 g/10 minutes);
E-7: Ethylene.propylene copolymer (ethylene unit ratio of copolymer = 4%, density = 0.90 g/cm$^3$ and MFR = 8.0 g/10 minutes);
A-1: Diglycerol monostearate;
A-2: Triglycerol monolaurate;
A-3: Sorbitan monostearate;
A-4: Myristyl diethanol amide;
A-5: Glycerol monostearate;
A-6: Mixture of glycerol monostearate and sorbitan monostearate at weight ratio of 50/50;
A-7: Lauryl diethanol amine;
A-8: Mixture of glycerol monostearate and myristyl diethanol amide at weight ratio of 50/50;
A-9: Mixture of glycerol monostearate and lauryl diethanol amine at weight ratio of 50/50;
B-1: Sodium myristyl sulfonate;
B-2: Sodium dioctyl sulfo succinate;
B-3: Sodium dodecyl benzene sulfonate;

TABLE 1-continued

| | Additions | | | Olefin Resin for Each Layer | | |
|---|---|---|---|---|---|---|
| (A) | (B) | (A)/(B) | Concentration (%) | Outer Layer (11) | Inner Layer (21) | Outer Layer (12) |

B-4: Mixture of sodium dioctyl sulfo succinate and sodium dodecyl benzene sulfonate at weight ratio of 50/50;
B-5: Lithium dibutyl naphthalene sulfonate;
B-6: Potassium α-(p-nonylphenyl)-ω-hydroxypoly(oxyethylene) sulfoacetate (oxyethylene repetition number = 3).

Part 2 (Evaluation of Laminated Polyolefin Films)

Antistatic property, antifogging property, transparency and stability in film production of each of the laminated polyolefin films produced in Part 1 were evaluated as explained below. The results are shown in Table 2.

Antistatic Property

After the humidity of each laminated polyolefin film produced in Part 1 was adjusted for 24 hours under the condition of 20° C. in temperature and 65% in relative humidity, its surface resistance was measured under the same condition by using a surface resistance measuring apparatus (trade name of SM-8210 produced by TOA Electronics Ltd.) and evaluated as follows. For measuring the effects of elapsed time, similar measurements and evaluations were made on samples maintained for four weeks under the temperature-humidity conditions of 40° C. and 50%.

A: Less than $1\times10^{12}\Omega$ (superior antistatic property);
B: $1\times10^{12}\Omega$ or greater but less than $1\times10^{13}\Omega$ (good antistatic property);
C: $1\times10^{13}\Omega$ or greater but less than $1\times10^{14}\Omega$ (poor antistatic property);
D: $1\times10^{14}\Omega$ or greater (very poor antistatic property).

Antifogging Property

After the humidity of laminated polyolefin films produced in Part 1 was adjusted for 24 hours under the condition of 20° C. in temperature and 65% in relative humidity, they were each attached to a beaker containing water at 20° C. After they were left for one hour in an atmosphere of 5° C., the attachment of water drops on the inner film surfaces was observed and evaluated as follows:

A: No water drops observed, transparent, superior antifogging property;
B: Some large water drops but transparent, good antifogging property;
C: Small water drops present; somewhat opaque, poor antifogging property;
D: Many small water drops present; opaque; very poor antifogging property.

Transparency

After the humidity of laminated polyolefin films produced in Part 1 was adjusted for 24 hours under the condition of 20° C. in temperature and 65% in relative humidity, their hazing conditions were measured and evaluated as follows:

A: Less than 5% (superior transparency);
B: 5% or greater but less than 10% (good transparency);
C: 10% or greater but less than 15% (poor transparency);
D: 15% or greater (very poor transparency).

Stability in Film Production

The manner of extrusion of olefin resin and the condition of film formation at the time of coextrusion were observed and evaluated as follows:

B: Film could be formed stably;
D: Film could not be formed due to instability in extrusion.

TABLE 2

| | Antistatic property | | | | Antifogging property | | | |
|---|---|---|---|---|---|---|---|---|
| | Outer layer (11) | | Outer layer (12) | | | | | |
| | After 24 hours | After 4 weeks | After 24 hours | After 4 weeks | Outer layer (11) | Outer layer (12) | Transparency | Stability in film production |
| Test Examples: | | | | | | | | |
| 1 | A | A | A | A | A | A | A | B |
| 2 | A | A | A | A | A | A | A | B |
| 3 | A | A | A | A | A | A | A | B |
| 4 | A | A | A | A | B | B | A | B |
| 5 | A | A | A | A | B | B | A | B |
| 6 | A | A | A | A | B | B | A | B |
| 7 | B | B | B | B | B | B | A | B |
| 8 | B | B | B | B | B | B | A | B |
| 9 | B | B | B | B | B | B | B | B |
| Comparison Examples: | | | | | | | | |
| 1 | C | D | C | D | D | D | C | B |
| 2 | C | D | C | D | C | C | D | B |
| 3 | D | D | D | D | D | D | D | B |
| 4 | * | * | * | * | * | * | * | D |

In Table 2 (and in subsequent Tables):
* A laminated polyolefin film could not be produced.

Part 3 (Production of Laminated Polyolefin Films

TEST EXAMPLE 10

Polyethylene (density 0.927 g/cm³ and MFR 4.0 g/10 minutes) as olefin resin 90 parts, triglycerol monolaurate as non-ionic surfactant 7 parts and sodium myristyl sulfonate as salt of organic sulfonic acid 3 parts were placed inside a tumbler, mixed together and thereafter melted and kneaded together by means of a twin extruder to obtain master pellets. These master pellets 4 parts and aforementioned polyethylene 96 parts were mixed together inside the tumbler. The mixture thus obtained was used for forming an outer layer on one side, ethylene•1-hexene copolymer (ethylene unit ratio of copolymer=96%, density=0.930 g/cm³ and MFR=1.0 g/10 minutes) was used for inner layer, and aforementioned polyethylene was used for forming the other outer layer on the other side in a T-die method of coextrusion while the mixture was cooled to 30° C. and to produce a laminated polyolefin film with three layers as shown in FIG. 2 with thickness 60 μm (ratio of thickness among the layers 13, 22, 23=1/4/1).

TEST EXAMPLES 11–18 AND COMPARISON EXAMPLES 5–8

As in Test Example 10, laminated polyolefin films of Test Examples 11–18 and Comparison Examples 5–8 were produced. Their details are shown together in Table 3.

TABLE 3

| | Additions | | | | Olefin Resin for Each Layer | | |
|---|---|---|---|---|---|---|---|
| | (A) | (B) | (A)/(B) | Concentration (%) | Outer Layer (13) | Inner Layer (22) | Outer Layer (23) |
| Test Examples: | | | | | | | |
| 10 | A-2 | B-1 | 70/30 | 0.4 | E-1 | E-3 | E-1 |
| 11 | A-3 | B-1 | 80/20 | 0.5 | E-6 | E-2 | E-6 |
| 12 | A-1 | B-2 | 60/40 | 0.8 | E-3 | E-6 | E-3 |
| 13 | A-5 | B-3 | 60/40 | 1.1 | E-3 | E-4 | E-3 |
| 14 | A-6 | B-4 | 50/50 | 1.7 | E-2 | E-4 | E-2 |
| 15 | A-4 | B-4 | 50/50 | 1.0 | E-3 | E-2 | E-2 |
| 16 | A-9 | B-5 | 60/40 | 0.8 | E-1 | E-4 | E-1 |
| 17 | A-7 | B-6 | 25/75 | 3.0 | E-5 | E-1 | E-1 |
| 18 | A-8 | B-5 | 95/5 | 0.08 | E-1 | E-2 | E-2 |
| Comparison Examples: | | | | | | | |
| 5 | A-5 | — | 100/0 | 0.5 | E-1 | E-2 | E-1 |
| 6 | A-9 | B-5 | 10/90 | 0.5 | E-1 | E-2 | E-1 |
| 7 | — | B-3 | 0/100 | 2.0 | E-1 | E-2 | E-2 |
| 8 | A-7 | B-6 | 50/50 | 5.0 | E-1 | E-6 | E-1 |

Part 4 (Evaluation of Laminated Polyolefin Films)

Antistatic property, antifogging property, transparency and stability in film production of each of the laminated polyolefin films produced in Part 3 were evaluated as done in Part 2. The results are shown in Table 4.

TABLE 4

| | Antistatic property Outer layer (13) | | Antifogging property Outer layer (13) | Transparency | Stability in film production |
|---|---|---|---|---|---|
| | After 24 hours | After 4 weeks | | | |
| Test Examples: | | | | | |
| 10 | A | A | A | A | B |
| 11 | A | A | A | A | B |
| 12 | A | A | A | A | B |
| 13 | A | A | B | A | B |
| 14 | A | A | B | A | B |
| 15 | A | A | B | A | B |
| 16 | B | B | B | A | B |
| 17 | B | B | B | A | B |
| 18 | B | B | B | B | B |
| Comparison Examples: | | | | | |
| 5 | C | D | C | D | B |
| 6 | C | D | D | C | B |
| 7 | D | D | D | D | B |
| 8 | * | * | * | * | D |

Part 5 (Production of Laminated Polyolefin Films)

TEST EXAMPLE 19

Polyethylene (density 0.927 g/cm$^3$ and MFR 4.0 g/10 minutes) as olefin resin 90 parts, diglycerol monostearate as non-ionic surfactant 7 parts and sodium myristyl sulfonate as salt of organic sulfonic acid 3 parts were placed inside a tumbler, mixed together and thereafter melted and kneaded together by means of a twin extruder to obtain master pellets. These master pellets 4 parts and aforementioned polyethylene 96 parts were mixed together inside the tumbler. The mixture thus obtained was used for forming outer layers on both sides and ethylene•1-butene copolymer (ethylene unit ratio of copolymer=95%, density=0.920 g/cm$^3$ and MFR=2.1 g/10 minutes) was used for forming inner layer in a tubular process of coextrusion to produce a laminated polyolefin film with three layers as shown in FIG. 1 with thickness 50 μm (ratio of thickness among the layers 11, 21, 12=1/3/1).

TEST EXAMPLES 20–27 AND COMPARISON EXAMPLES 9–12

As in Test Example 19, laminated polyolefin films of Test Examples 20–27 and Comparison Examples 9–12 were produced. Their details are shown together in Table 5.

TABLE 5

| | Additions | | | | Olefin Resin for Each Layer | | |
|---|---|---|---|---|---|---|---|
| | (A) | (B) | (A)/(B) | Concentration (%) | Outer Layer (11) | Inner Layer (21) | Outer Layer (12) |
| Test Examples: | | | | | | | |
| 19 | A-1 | B-1 | 70/30 | 0.4 | E-1 | E-2 | E-1 |
| 20 | A-3 | B-2 | 80/20 | 0.2 | E-2 | E-3 | E-2 |
| 21 | A-2 | B-1 | 60/40 | 0.8 | E-3 | E-4 | E-3 |
| 22 | A-6 | B-4 | 60/40 | 1.0 | E-3 | E-4 | E-3 |
| 23 | A-4 | B-4 | 50/50 | 1.2 | E-2 | E-4 | E-2 |
| 24 | A-5 | B-3 | 50/50 | 1.5 | E-3 | E-2 | E-3 |
| 25 | A-7 | B-6 | 60/40 | 0.8 | E-1 | E-6 | E-1 |
| 26 | A-9 | B-5 | 25/75 | 2.7 | E-5 | E-1 | E-5 |
| 27 | A-8 | B-5 | 95/5 | 0.08 | E-1 | E-2 | E-1 |
| Comparison Examples: | | | | | | | |
| 9 | A-5 | — | 100/0 | 0.5 | E-1 | E-3 | E-1 |
| 10 | A-9 | B-5 | 15/85 | 0.5 | E-1 | E-2 | E-1 |
| 11 | — | B-3 | 0/100 | 2.0 | E-2 | E-3 | E-2 |
| 12 | A-7 | B-6 | 50/50 | 5.0 | E-2 | E-6 | E-2 |

Part 6 (Evaluation of Laminated Polyolefin Films)

Antistatic property, antifogging property, transparency and stability in film production of each of the laminated polyolefin films produced in Part 5 were evaluated as done in Part 2. The results are shown in Table 6.

TABLE 6

| | Antistatic property | | | | Antifogging property | | | |
|---|---|---|---|---|---|---|---|---|
| | Outer layer (11) | | Outer layer (12) | | | | | |
| | After 24 hours | After 4 weeks | After 24 hours | After 4 weeks | Outer layer (11) | Outer layer (12) | Transparency | Stability in film production |
| Test Examples: | | | | | | | | |
| 19 | A | A | A | A | A | A | A | B |
| 20 | A | A | A | A | A | A | A | B |
| 21 | A | A | A | A | A | A | A | B |
| 22 | A | A | A | A | B | B | A | B |
| 23 | A | A | A | A | B | B | A | B |
| 24 | A | A | A | A | B | B | B | B |
| 25 | B | B | B | B | B | B | A | B |
| 26 | B | B | B | B | B | B | B | B |
| 27 | B | B | B | B | B | B | B | B |

TABLE 6-continued

| | Antistatic property | | | | Antifogging property | | | |
| --- | --- | --- | --- | --- | --- | --- | --- | --- |
| | Outer layer (11) | | Outer layer (12) | | | | | Stability |
| | After 24 hours | After 4 weeks | After 24 hours | After 4 weeks | Outer layer (11) | Outer layer (12) | Transparency | in film production |
| Comparison Examples: | | | | | | | | |
| 9 | C | D | C | D | D | D | D | B |
| 10 | C | D | C | D | C | C | D | B |
| 11 | D | D | D | D | D | D | D | B |
| 12 | * | * | * | * | * | * | * | D |

Part 7 (Production of Laminated Polyolefin Films)

TEST EXAMPLE 28

Polyethylene (density 0.927 g/cm$^3$ and MFR 4.0 g/10 minutes) as olefin resin 90 parts, diglycerol monostearate as non-ionic surfactant 7 parts and sodium myristyl sulfonate as salt of organic sulfonic acid 3 parts were placed inside a tumbler, mixed together and thereafter melted and kneaded together by means of a twin extruder to obtain master pellets. These master pellets 4 parts and aforementioned polyethylene 96 parts were mixed together inside the tumbler. The mixture thus obtained was used for forming an outer layer on one side and ethylene•1-butene copolymer (ethylene unit ratio of copolymer 95%, density=0.920 g/cm$^3$ and MFR=2.1 g/10 minutes) was used for forming another outer layer on the other side in a T-die method of coextrusion to produce a laminated polyolefin film with two layers as shown in FIG. 3 with thickness 50 μm (ratio of thickness between the layers 14, 24=1/4).

TEST EXAMPLES 29–36 AND COMPARISON EXAMPLES 13–16

As in Test Example 28, laminated polyolefin films of Test Examples 29–36 and Comparison Examples 13–16 were produced. Their details are shown together in Table 7.

TABLE 7

| | Additions | | | | Olefin Resin for Each Layer | |
| --- | --- | --- | --- | --- | --- | --- |
| | (A) | (B) | (A)/(B) | Concentration (%) | Outer Layer (14) | Outer Layer (24) |
| Test Examples: | | | | | | |
| 28 | A-1 | B-1 | 70/30 | 0.4 | E-1 | E-2 |
| 29 | A-3 | B-2 | 80/20 | 0.2 | E-2 | E-1 |
| 30 | A-2 | B-1 | 60/40 | 0.9 | E-3 | E-6 |
| 31 | A-6 | B-4 | 60/40 | 1.3 | E-3 | E-5 |
| 32 | A-4 | B-4 | 50/50 | 1.2 | E-2 | E-3 |
| 33 | A-5 | B-3 | 50/50 | 1.0 | E-3 | E-2 |
| 34 | A-7 | B-6 | 60/40 | 0.8 | E-6 | E-2 |
| 35 | A-9 | B-5 | 25/75 | 2.7 | E-5 | E-1 |
| 36 | A-8 | B-5 | 95/5 | 0.08 | E-1 | E-2 |
| Comparison Examples: | | | | | | |
| 13 | A-5 | — | 100/0 | 0.5 | E-1 | E-2 |
| 14 | A-9 | B-5 | 15/85 | 0.5 | E-1 | E-2 |
| 15 | — | B-3 | 0/100 | 2.0 | E-2 | E-3 |
| 16 | A-7 | B-6 | 50/50 | 5.0 | E-2 | E-3 |

Part 8 (Evaluation of Laminated Polyolefin Films)

Antistatic property, antifogging property, transparency and stability in film production of each of the laminated polyolefin films produced in Part 7 were evaluated as done in Part 2. The results are shown in Table 8.

TABLE 8

| | Antistatic property Outer layer (14) | | Antifogging property | | Stability |
| --- | --- | --- | --- | --- | --- |
| | After 24 hours | After 4 weeks | Outer layer (14) | Transparency | in film production |
| Test Examples: | | | | | |
| 28 | A | A | A | A | B |
| 29 | A | A | A | A | B |
| 30 | A | A | A | A | B |
| 31 | A | A | B | A | B |
| 32 | A | A | B | A | B |
| 33 | A | A | B | B | B |
| 34 | B | B | B | A | B |
| 35 | B | B | B | B | B |
| 36 | B | B | B | B | B |
| Comparison Examples: | | | | | |
| 13 | C | D | D | D | B |
| 14 | C | D | C | D | B |
| 15 | D | D | D | D | B |
| 16 | * | * | * | * | D |

As can be understood from the above, the present invention has the merit of being able to provide superior and durable antistatic and antifogging properties to a laminated polyolefin film without adversely affecting its natural transparency as it is being produced by a coextrusion method.

What is claimed is:

1. A method of producing a laminated polyolefin film with three or more layers including two outer layers, said method comprising the steps of:

preparing an outer-layer forming material by causing olefin resin to contain a non-ionic surfactant and salt of organic sulfonic acid in a total amount of 0.05–3 weight % and at a weight ratio of 20/80–99/1;

producing the laminated polyolefin film by using olefin resin and said outer-layer forming material in a coextrusion method and forming at least one of said outer layers from said outer-layer forming material;

wherein said non-ionic surfactant comprises one or more selected from the group consisting of partial esters of polyoles with valence 3–6 and aliphatic monocarboxylic acid with 6–22 carbon atoms, alkyl diethanol amines with ailcyl group with 6–22 carbon atoms and alkyl diethanol amides with acyl group with 6–22 carbon atoms; and wherein said salt of organic sulfonic acid comprises one or more selected from the group consisting of alkali salts of alkyl sulfonic acid with alkyl group with 6–22 carbon atoms, alkali salts of alkyl aryl sulfonic acid with alkyl group with 2–22 carbon atoms and alkali salts of sulfo fatty acid ester with alkyl group with 2–22 carbon atoms.

2. The method of claim 1 wherein said non-ionic surfactant is a partial ester of polyoles with valence 4 or 5 and aliphatic carboxylic acid with 12–18 carbon atoms.

3. The method of claim 2 wherein said salt of organic sulfonic acid is alkali salt of alkyl sulfonic acid with alkyl group with 12–18 carbon atoms.

4. The method of claim 3 wherein said outer-layer forming material is prepared by causing olefin resin to contain said non-ionic surfactant and said salt of organic sulfonic acid in a total amount of 0.2–0.9 weight % and at a weight ratio of 60/40-80/20.

5. The method of claim 1 wherein said salt of organic sulfonic acid is alkali salt of alkyl sulfonic acid with alkyl group with 12–18 carbon atoms.

6. The method of claim 1 wherein said outer-layer forming material is prepared by causing olefin resin to contain said non-ionic surfactant and said salt of organic sulfonic acid in a total amount of 0.2–0.9 weight % and at a weight ratio of 60/40–80/20.

7. A laminated polyolefin film produced by the method of claim 1.

8. The laminated polyolefin film of claim 7 wherein said non-ionic surfactant is a partial ester of polyoles with valence 4 or 5 and aliphatic carhoxylic acid with 12–18 carbon atoms, wherein said salt of organic sulfonic acid is alkali salt of alkyl sulfonic acid with alkyl group with 12–18 carbon atoms, and wherein said outer-layer forming material is prepared by causing olefin resin to contain said non-ionic surfactant and said salt of organic sulfonic acid in a total amount of 0.2–0.9 weight % and at a weight ratio of 60/40–80/20.

9. A method of producing a laminated polyolefin film with two layers, said method comprising the steps of:

preparing an outer-layer forming material by causing olefin resin to contain a non-ionic surfactant and salt of organic sulfonic acid in a total amount of 0.05–3 weight % and at a weight ratio of 20/80–99/1;

producing the laminated polyolefin film with two layers by using olefin resin and said outer-layer forming material in a coextrusion method and forming one of said two layers from said outer-layer forming material;

wherein said non-ionic surfactant comprises one or more selected from the group consisting of partial esters of pelyoles with valence 3–6 and aliphatic monocarboxylic acid with 6–22 carbon atoms, alkyl diethanol amines with alkyl group with 6–22 carbon atoms and alkyl diethanol amides with acyl group with 6–22 carbon atoms; and wherein said salt of organic sulfonic acid comprises one or more selected from the group consisting of alkali salts of alkyl sulfonic acid with alkyl group with 6–22 carbon atoms, alkali salts of alkyl aryl sulfonic acid with alkyl group with 2–22 carbon atoms and alkali salts of sulfo fatty acid ester with alkyl group with 2–22 carbon atoms.

10. The method of claim 9 wherein said non-ionic surfactant is a partial ester of polyoles with valence 4 or 5 and aliphatic carboxylic acid with 12–18 carbon atoms.

11. The method of claim 10, wherein said salt of organic sulfonic acid is alkali salt of alkyl sulfonic acid with alkyl group with 12–18 carbon atoms.

12. The method of claim 11 wherein said outer-layer forming material is prepared by causing olefin resin to contain said non-ionic surfactant and said salt of organic sulfonic acid in a total amount of 0.2–0.9 weight % and at a weight ratio of 60/40–80/20.

13. The method of claim 9 wherein said salt of organic sulfonic acid is alkali salt of alkyl sulfonic acid with alkyl group with 12–18 carbon atoms.

14. The method of claim 9, wherein said outer-layer forming material is prepared by causing olefin resin to contain said non-ionic surfactant and said salt of organic sulfonic acid in a total amount of 0.2–0.9 weight % and at a weight ratio of 60/40–80/20.

15. A laminated polyolefin film produced by the method of claim 9.

16. The laminated polyolefin film of claim 15 wherein said non-ionic surfactant is a partial ester of polyoles with valence 4 or 5 and aliphatic carboxylic acid with 12–18 carbon atoms, wherein said salt of organic sulfonic acid is alkali salt of alkyl sulfonic acid with alkyl group with 12–18 carbon atoms, and wherein said outer-layer forming material is prepared by causing olefin resin to contain said non-ionic surfactant and said salt of organic sulfonic acid in a total amount of 0.2–0.9 weight % and at a weight ratio of 60/40–80/20.

* * * * *